H. C. SHUTE.
DRAFT CONTROLLING THROTTLE MEANS.
APPLICATION FILED AUG. 21, 1913.
1,117,263.
Patented Nov. 17, 1914.
2 SHEETS—SHEET 1.
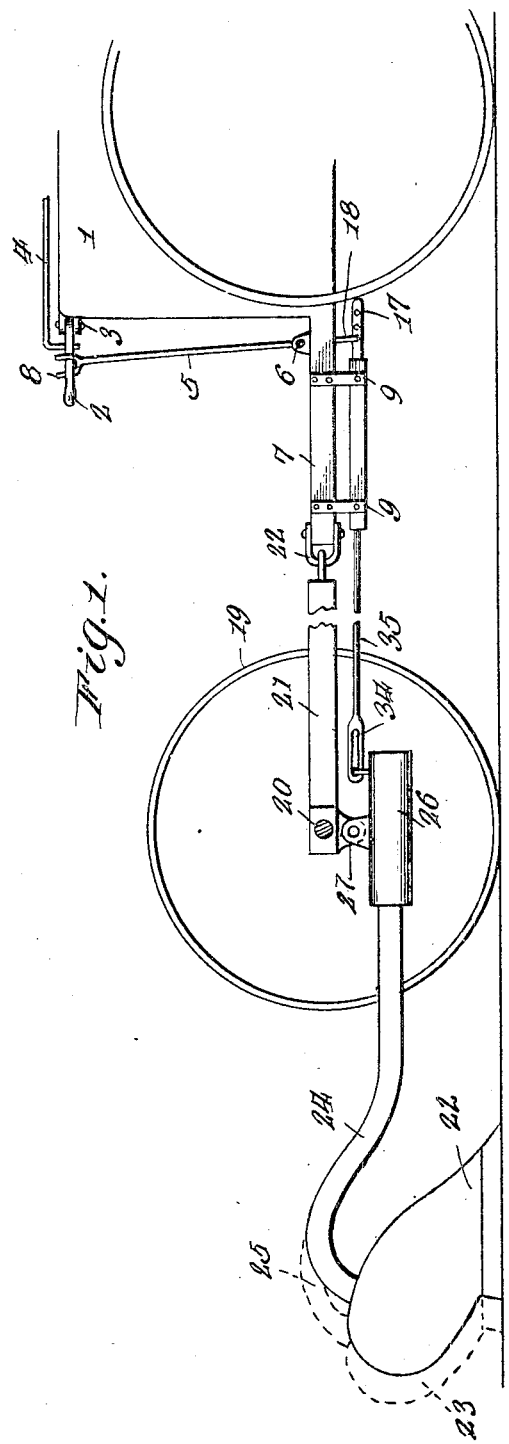
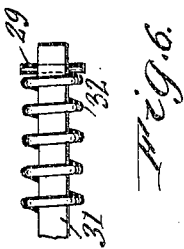
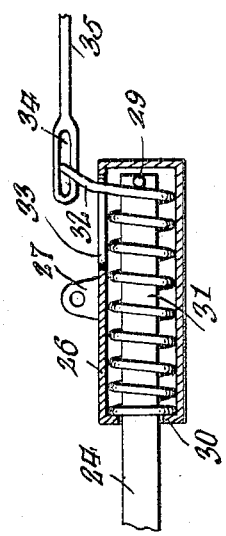
Witnesses
G. M. Spring.
C. H. Crawford
Inventor
Henry C. Shute,
By Richard Bowen,
his Attorney

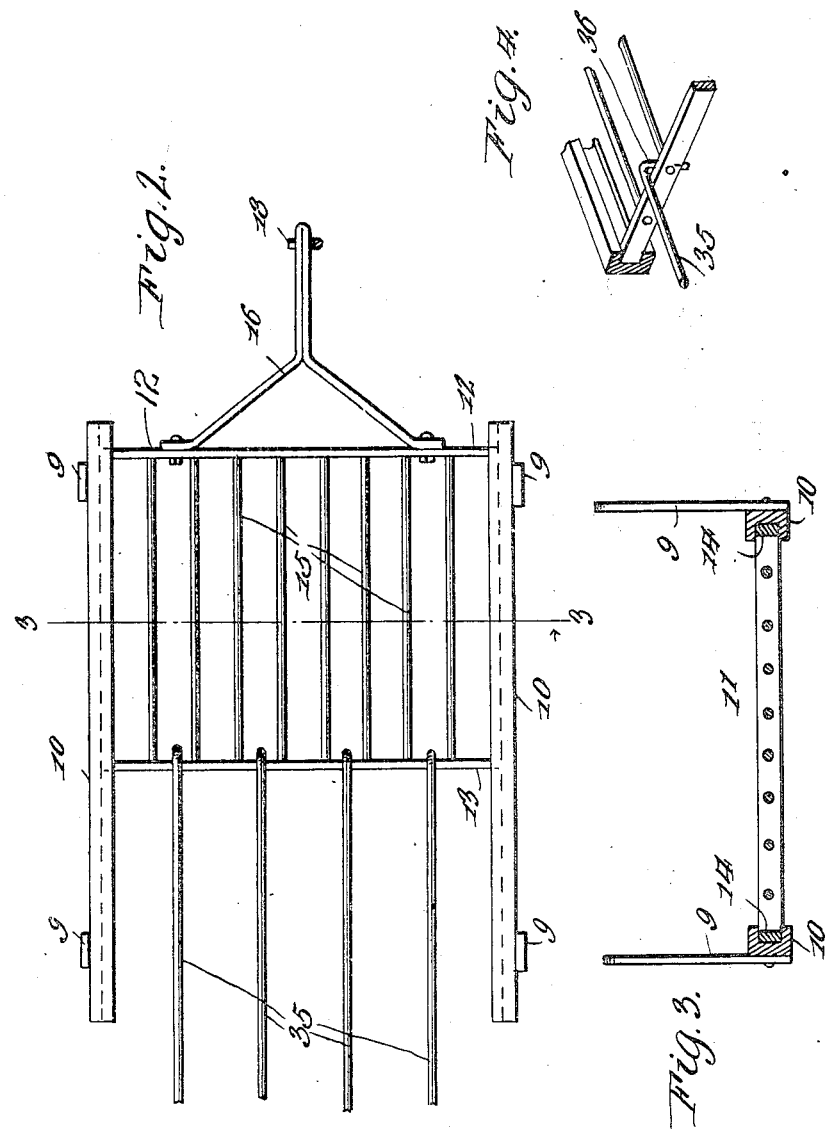

UNITED STATES PATENT OFFICE.

HENRY C. SHUTE, OF NATHAN, ARKANSAS.

DRAFT-CONTROLLING THROTTLE MEANS.

1,117,263.

Specification of Letters Patent.  Patented Nov. 17, 1914.

Application filed August 21, 1913. Serial No. 786,003.

*To all whom it may concern:*

Be it known that I, HENRY C. SHUTE, a citizen of the United States, residing at Nathan, in the county of Pike and State of Arkansas, have invented certain new and useful Improvements in Draft-Controlling Throttle Means, of which the following is a specification.

This invention relates to an improvement in draft appliances for controlling the throttle or controlling member of a source of draft power so that when the device is applied to a series of implements such as plows, the source of draft power will be automatically shut off upon arrest of advancing movement of any one of the plows by contact thereof with a stump or a large stone, so as to prevent breakage which might otherwise occur.

The device of my invention is especially applicable where more than one plow is employed in connection with a traction engine or other source of draft power, and it is one of the objects of my invention to yieldingly or extensibly connect the several plows with the engine and to provide a single movable structure which is operatively connected with the controlling member or throttle, and which is provided with an independent connection with each implement or plow so that upon arrest of advance of any one of the plows the throttle or controlling member will be operated to stop the engine.

Other features of novelty will be more fully described in connection with the accompanying drawings and will be more fully pointed out in and by the appended claims.

In the drawings:—Figure 1 is a veiw in side elevation of the device of my invention as applied to a gang plow and an engine. Fig. 2 is a plan view of a movable or slidable controlling means adapted for connection with the several plows and with the throttle. Fig. 3 is a sectional view thereof on line 3—3 of Fig. 2. Fig. 4 if a fragmental perspective view with portions in sections. Fig. 5 is a vertical longitudinal sectional view showing one form of extensible or yielding connection for one of the plows. Fig. 6 is a horizontal view of such connection with the outer part thereof omitted.

Like characters of reference designate similar parts throughout the different figures of the drawings.

As illustrated, 1 designates the rear end of a source of draft power which may be a traction engine, and it is provided with a controlling member or throttle 2. The controlling member or throttle 2 is pivoted at 3 and may control the throttle valve by means of a throttle rod 4. A throttle controlling lever 5 is pivotally mounted at 6 on an extension 7 of the engine, and the upper end of the lever 5 may be connected with the throttle 2 by means of a bifurcated terminal 8. The extension support 7 is provided with pendant hangers 9 which serve as supports for grooved guides 10. A frame, indicated at 11, as a whole, is slidable in said guides 10 and said frame may consist of front and rear transverse frame members 12 and 13, respectively, and lateral members 14 which are adapted to slide in the grooved ways of guides 10. In order to render the sliding means or frame more rigid, the front and rear transverse members 12 and 13 are connected by a plurality of rods 15. A yoke 16, connected with the front transverse member 12 is provided with a plurality of apertures 17 for connection therewith of the lower end 18 of the throttle controlling member 5. It will thus be seen that any movement of the throttle 2 will impart movement to the sliding means or frame 11, and likewise, any movement of the sliding means or frame 11 will impart movement to the throttle 2.

In the present construction, I provide a truck for supporting the front ends of the plow beams and the truck is mounted upon bearing wheels 19 and includes an axle 20, and a truck frame 21. A connection such as a clevis device 22 serves to rigidly or inextensibly connect the plow truck with the engine against relative movement therebetween in directions away from each other.

Plows 22 and 23, having plow beams 24 and 25, respectively, are disposed in the rear of the plow truck, as is clearly shown in Fig. 1, and the plow truck carries a plurality of devices for yielding connection with the plow beams of the plows. As shown, a casing 26, for each plow, is provided with a lug 27 adapted to be pivotally supported on a rod 28 suspended from the plow truck. As each yielding device is similar in construction and operation, only one need be described in detail.

The front end of the plow beam 24 is disposed longitudinally in the casing 26 and is provided on its forward end with a spring abutment or pin 29. A shoulder 30 is provided at the rear of said casing 26 and an expansively acting spring 31 is interposed between said shoulder and abutment to normally act to hold the parts in the position shown in Fig. 5, the spring yielding under the load imposed by action of the plow. One terminal of the spring, as indicated at 32, extends through a slot or opening 33 for a loose play connection in a slot 34 of a rod 35. The rod 35 is loosely connected with the sliding frame 11, preferably by being loosely hooked over the rear transverse frame member 13, the rod 35 having a hooked or downwardly extending portion 36. A rod similar to rod 35 is provided for connection with the spring of each plow, there being four plows contemplated for use in the construction, as shown in Fig. 2.

It will be seen that the springs 31 have a lost motion connection with the rods 35 so that if any one of the plows should strike a root or small stone and be slightly retarded or arrested with respect to the other plows, momentarily, such arrest of movement will not be sufficient to close the throttle because of the slot 34. However, if any one of the plows should meet with an obstruction that would cause an abruptly complete arrest of advancing movement, then the spring of the plow would actuate its rod 35 and close the throttle. By reason of the loose connection of the hooked forward ends of the rods 35 with the transverse member 13, it will be seen that any one of the rods 35 can draw the frame 11 rearwardly while the remaining rods 35 will freely slide on the member 13 and permit rearward movement thereof, it being understood that any appreciable backward movement of the rods 35 would slide the frame 11 rearwardly. It will also be understood that there will be ample lost motion in the connections so as to prevent closing of the throttle under any slight or temporary arrest of one plow with respect to another.

While I believe that the device of my invention is best adapted for use in connection with more than one plow, still, its adaptability to one plow will be clear, and it will be seen that by constructing and arranging the parts as has been hereinbefore set forth so that each plow has a spring mounted to coöperate therewith, the structure is made more sensitive than would be possible were a single spring connected in the draft yoke or at the main draft as at 16.

It will be seen that I have provided independent yielding devices for connecting each plow with an engine, there being provided means independently connected with each plow, and with the controlling member or throttle of the engine to close the latter upon arrest or advance of any one of the plows.

While I have herein shown and described one specific form of my invention, I do not wish to be limited thereto, except for such limitations as the claims may import.

I claim:—

1. In combination with a draft engine having a controlling member, of a plurality of implements to be drawn, and an independent yielding device for connecting each implement positively against relative movement thereof away from the engine, movable means connected with said controlling member, and an independent connection between each plow and said means, substantially as described.

2. In combination with a draft engine having a controlling member, of a plurality of implements to be drawn, an extensible device for connecting each implement for draft by the engine, a frame slidably mounted on the engine and operatively connected with said controlling member, and an independent connection between each implement and said frame, substantially as described.

3. In combination with a draft engine having a controlling member, of a plurality of implements to be drawn, an extensible device for connecting each implement for draft by the engine, a frame slidably mounted on the engine and operatively connected with said controlling member, and independent elements for each plow, each having a loose connection with said frame, substantially as described.

4. In combination with a draft engine having a controlling member, a frame slidably mounted on said engine and operatively connected with said controlling member, a truck connected with said engine, a plurality of plows each having independent yielding connection with said truck, and rods loosely connected with said plows and having hooked ends connected with said frame, substantially as described.

5. In combination with a draft engine having a controlling member, a frame slidably mounted on said engine and operatively connected with said controlling member, a truck connected with said engine, a plurality of plows provided with plow beams, a spring device for connecting each plow beam with said truck, and a rod connecting each spring device with said frame, substantially as described.

6. In combination with a draft engine having a controlling member, a plurality of plows connected to be drawn by said engine, and movable means common to all of said plows and having independent connection therewith and operatively connected with said controlling member, substantially as described.

7. In combination with a draft engine having a controlling member, means movably mounted on the engine and operatively connected with said controlling member, a plow truck, a plurality of casings carried by said truck, a plurality of plows having plow beams longitudinally movable in said casings, springs for connecting said plow beams with said casings, and an independent connection for each spring with said movable means, substantially as described.

8. A plow truck having a plurality of spring casings pivotally mounted thereon, a plurality of plows having plow beams longitudinally movable in said casings, springs for connecting said plow beams with said casings, propelling means for said plows, movable means carried by said propelling means to control the operation thereof, and an independent connection for each spring with said movable means, substantially as described.

In testimony whereof I affix my signature in presence of two witnesses.

HENRY C. SHUTE.

Witnesses:
S. S. LANGLEY,
W. J. McRAE.